United States Patent [19]
Raetzsch et al.

[11] Patent Number: 6,077,907
[45] Date of Patent: Jun. 20, 2000

[54] MOLDED POLYOLEFIN PARTS OF IMPROVED DIMENSIONAL STABILITY AT ELEVATED TEMPERATURES AND IMPROVED STIFFNESS

[75] Inventors: Manfred Raetzsch, Kirchschlag; Achim Hesse, Linz; Norbert Reichelt, Neuhofen; Ulf Panzer, Perg; Markus Gahleitner, Neuhofen/Krems; Max Wachholder, Mauthausen; Karl Kloimstein, Wels, all of Austria

[73] Assignee: Borealis AG, Schwechat-Mannswoerth, Austria

[21] Appl. No.: 09/099,893

[22] Filed: Jun. 18, 1998

[30] Foreign Application Priority Data

Jul. 9, 1997 [DE] Germany ............... 197 29 231
Feb. 14, 1998 [DE] Germany ............... 198 06 105

[51] Int. Cl.$^7$ ........................................ C08F 8/00
[52] U.S. Cl. .................. 525/191; 525/197; 525/198; 525/331.7; 525/70; 525/71; 525/78; 264/45.1; 264/45.7; 264/45.9; 264/219; 264/232; 264/239
[58] Field of Search ...................... 525/191, 197, 525/198, 331.7, 70, 71, 78; 264/45.1, 45.7, 45.9, 219, 230, 239

[56] References Cited

U.S. PATENT DOCUMENTS 5,589,541 12/1996 Kinoshita et al. ............... 525/66

*Primary Examiner*—Duc Truong
*Attorney, Agent, or Firm*—Jordan and Hamburg LLP

[57] ABSTRACT

Molded polyolefin articles of improved dimensional stability at elevated temperatures and improved stiffness and consist of mixtures of modified propylene polymers, which are synthesized by free radical coupling reactions or polymer-like reactions of functionalized polypropenes, and of unmodified propylene polymers, crystalline copolymers of propylene and α-olefins, elastic copolymers of ethylene and α-olefins, largely amorphous polypropylenes, non-isotactic propylene homopolymers, and auxiliary materials.

The molded polyolefin articles, produced by blow molding or injection molding are suitable for use in the packaging industry, for use in the domestic appliances industry, to meet the requirements of laboratories and hospitals, for gardening and agricultural implements, for transporting containers for components in the automobile industry, and for components of machines and of electric and electronic equipment.

35 Claims, No Drawings

MOLDED POLYOLEFIN PARTS OF IMPROVED DIMENSIONAL STABILITY AT ELEVATED TEMPERATURES AND IMPROVED STIFFNESS

BACKGROUND OF THE INVENTION

The invention relates to molded polyolefin parts of improved thermal stability at elevated temperatures and improved stiffness, made by blow molding or injection molding from mixtures of unmodified propylene polymers and modified propylene polymers, which are suitable for use in the packaging industry, in the domestic appliances industry, to meet the requirements of laboratories and hospitals, for gardening and agricultural implements, for transporting containers and for components in the automobile industry and components of machinery and electric and electronic equipment. Furthermore, the invention relates to a method for producing these molded polyolefin parts.

Molded polyolefin parts, produced by blow molding or injection molding, are known.

The production of molded polyolefin parts, produced by blow molding from polyethylene, has the advantage over the production of parts, produced by blow molding from polypropylene, in that parts having a large volume can also be produced from polyethylene. The low values for the dimensional stability at elevated temperatures, the stiffness, the stress crack resistance, the transparency and the surface hardness are disadvantages of blow-molded polyethylene parts.

Blow-molded polypropylene parts in the form of bottles, coverings, connecting pieces, boxes and small-capacity containers are known ("Blasformen von Polypropylen" (Blow-Molding Propylene) VDI-Verlag Düsseldorf 1980; Modem Plastics Intern. (1996) 5, 55–57; Neiβl, W. Kunststoffe 82 (1992) 140–142).

Polypropylene blends with talcum or glass fibers to further increase the stiffness and dimensional stability at elevated temperatures of the blow-molded parts and polypropylene blends with elastomers to increase the cold impact strength of the blow molded parts are also known (Lee, N., "Plastic Blow Molding Handbook", Van Norstrand Reinhold Publishers, New York 1990, pages 391–395).

The more nonuniform distribution of wall thicknesses as the volume of the blow molded parts increases is a disadvantage of blow molded polypropylene parts. Large volume parts can be produced from polyethylene, but not from polypropylene.

Known methods for producing blow-molded polyolefin parts are extrusion blow molding, extrusion stretch blow molding, injection blow molding and injection stretch blow molding (Lee, N., "Plastic Blow Molding Handbook", Van Norstrand Reinhold Publishers, New York 1990; Rosato, D., "Blow Molding Handbook", Carl-Hanser-Verlag Munich 1989).

The extrusion blow molding represents a two-step process, for which a tube is produced as parison in the first step and is molded in the second step in a synchronously operating blowing station in a divided mold and molded by being blown up into the hollow object.

Extrusion stretch blow molding is a variation of the extrusion blow molding, in which the preformed hollow object is subjected in a further step of the method in a blowing station to longitudinal stretching by a stretching stamp and radial stretching by an air blast.

In injection blow molding, the hollow object parison is produced by injection molding. The parisons are supplied either discontinuously to separate blow-molding equipment and molded or, in the multi-station injection blow molding equipment, by a turning table to the blowing mold and, after molding, to the ejector. In the case of injection blow molding as a variation of injection blow molding, an additional longitudinal stretching by a stretching stamp takes place in the blowing station during the molding process.

Known methods of increasing the stiffness of molded polyolefin parts, which are produced by injection molding and based on polypropylene, are the use of polypropylene blends with fillers, such as talcum (Grolik, W., Kunststoffe 80 (1990) 3, 342–347) or wollastonite (Pääkönen, E., Kunststoffe 77 (1987) 6, 602–606), or the use of polypropylene blends with glass fibers (Zettler, M. Kunstoffe 79 (1989) 9, 797–803).

Furthermore, it is known that the stiffness of injection molded polypropylene parts can be increased by using nucleating agents, such as sodium benzoate or sorbitol derivatives (Pukansky, B., ANTEC '96, 2317–2321).

The simultaneous decrease in impact strength of the injection molded parts when fillers, glass fibers or nucleating agents are used to increase the stiffness of the injection molded polyolefin parts is a disadvantage.

It is also known that the addition of ethylene-propylene elastomers improves the toughness of talcum-filled polypropylene (Pukanszky, B., Polymer Engineering and Science 35 (1995) 24 1962 1971) and the addition of acrylic acid-modified ethylene-propylene elastomers improves the toughness of glass fiber-reinforced polypropylene (Keiner, I., Angew. Makromoleculare Chem. 189 (1991), 207–218).

The addition of elastomers is, however, associated with a loss in stiffness and of dimensional stability at elevated temperatures, so that a balanced profile of the properties of stiffness and dimensional stability at elevated temperatures of injected molded parts subjected to high stresses cannot be achieved by these measures.

Finally, stiff and tough injection-molded parts, based on mixtures of propylene-ethylene block copolymers and ethylene-propylene elastomers, are known (JP 9703295, JP 9703298). For these reactor blends, however, the stiffness level is unsatisfactory.

SUMMARY OF THE INVENTION

The object of the invention are blow-molded or injection-molded polyolefin parts of imp roved dimensional stability at elevated temperatures and improved stiffness, which avoid the disadvantages of known formulations.

Pursuant to the invention, this objective is accomplished by molded polyolefin parts of improved dimensional stability at elevated temperatures and improved stiffness, which are produced by blow molding or injection molding 60 to 99.9% by weight and preferably 75 to 98% by weight of unmodified propylene polymers A and 40 to 0.1% by weight and preferably 25 to 2% by weight of modified propylene polymers B.

DETAILED DESCRIPTION OF THE INVENTION

The unmodified propylene polymers A, contained in the molded polyolefin parts, consist of:

A1) conventional propylene polymers, preferably propylene homopolymers produced using Ziegler-Natta catalysts or metallocene catalysts, especially with an $M_w/M_n$ ratio of 2 to 4.5, and/or copolymers of propylene, ethylene and/or α-olefins with 4 to 18 carbon atoms and a propylene content of 80.0 to 99.9% by weight in the form of random copolymers, block copolymers and/or random block copolymers, with melt indexes of 0.1 to 300 g/10 min at 230° C./2.16 kg and preferably of 1 to 100 g/10 min at 230° C./2.16 kg, and/or A2) a polyolefin mixture with an $M_w/M_n$ ratio of 2 to 6 and a melt index of 1 to 40 g/10 min at 230° C./2.16 kg, which consists of A2.1) 60 to 98% by weight of a crystalline copolymer of 85 to 95% by weight of propylene and 15 to 0.5% by weight of ethylene and/or an α-olefin of the general formula $CH_2=CHR$, wherein R is a linear or branched alkyl group with 2 to 8 carbon atoms, A2.2) 2 to 40% by weight of an elastic copolymer of 20 to 70% by weight of ethylene and 80 to 30% by weight of propylene and/or an α-olefin of the general formula $CH_2=CHR$, wherein R is a linear or branched alkyl group with 2 to 8 carbon atoms, and/or A3) largely amorphous polypropylenes or propylene copolymers with a crystalline polypropylene or crystalline propylene copolymer content of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent propylene and not more than 20 mole percent of one or more α-olefins of the general formula $CH_2=CHR$, wherein R is a linear or branched alkyl group with 2 to 8 carbon atoms, and/or A4) non-isotactic propylene homopolymers with a melting point of 145° to 165° C., a melt viscosity of 200,000 cps at 190° C. and a heat of crystallization of 4 to 10 calories per gram, 35 to 55% by weight being soluble in diethyl ether.

The polyolefin mixtures of crystalline copolymers and elastic copolymers, optionally contained as component A2) in the inventive molded polyolefin parts are, for example, the polymer mixtures described in EP 400 333 or EP 472 946.

The largly amorphous polypropylene or propylene copolymers optionally contained as component A3) in the inventive molded polyolefin parts are, in particular, stereo block polypropylenes, which are synthesized, for example, using highly active, metal oxide-fixed Ziegler-Natta catalysts (Collette, J., Macromolecules 22 (1989), 3850–3851; DE 2830160) or soluble Ziegler-Natta catalysts (de Candia, F., Makromol. Chem. 189 (1988), 815–821) optionally with subsequent reactive modification (EP 0 636 963) and/or degradation (EP 0 640 850).

Examples of non-isotactic propylene homopolymers, optionally contained as component A4) in the inventive molded polyolefin parts, are the products described in EP 475 307 or EP 475 308.

Molded polyolefin parts, which contain several of the unmodified propylene polymers A1) to A4) in addition to the modified propylene polymers B), are especially preferred. The cold impact strength of the inventive molded polyolefin parts increases as the content of components A2), A3) and A4) increases in the molded polyolefin parts. Molded polyolefin parts with a high stiffness and surface hardness contain a high proportion of components A1) and B).

In the unmodified propylene polymers A1) to A4), 0.01 to 2.5% by weight of stabilizers, 0.01 to 5% by weight of processing aids, 0.1 to 1% by weight of antistats, 0.2 to 3% by weight of pigments, 0.05 to 1% by weight of nucleating agents, 2 to 20% by weight of flame retardants, in each case based on the sum of the unmodified propylene polymers A, are contained as auxiliary materials and/or 3 to 40% by weight, based on the sum of the unmodified propylene polymers A are contained as inorganic and/or organic fillers and/or reinforcing materials.

The stabilizers, contained in the inventive, molded polyolefin parts, preferably are preferably mixtures of 0.01 to 0.6% by weight of phenolic antioxidants, 0.01 to 0.6% by weight of 3-arylbenzofuranones, 0.01 to 0.6% by weight of processing stabilizers based on phosphites, 0.01 to 0.6% by weight of high temperature stabilizers based on disulfides and thioethers and/or 0.01 to 0.8% by weight of sterically hindered amines (HALS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis(6-t-butyl-4-methylphenol), 4,4'-thio-bis-(6-t-butyl-2-methylphenol), octadecyl 3(3,5-di-t-butyl-4-hydroxyphenyl)propionate, 1,3,5-trimethyl-2,4,6-tris(3',5'-di-t-butyl-4-hydroxybenzyl)benzene and/or pentaerythritol-tetrakis(3-(3,5-di-t-butyl-4-hydroxyphenyl) propionate.

As benzofuranone derivative, 5,7-di-t-butyl-3-(3,4-dimethylphenyl)-3H-2-benzofuranone is particularly suitable.

As HALS compounds, bis-2,2,6,6-tetramethyl-4-piperidyl sebacate and/or poly-((1,1,3,3,-tetramethylbutyl)-imino)-1,3,5-triazine-2,4,diyl)(2,2,6,6-tetramethylpiperidyl)-amino)-hexamethylene-4-(2,2,6,6-tetramethylpiperidyl)-imino) are particularly suitable.

The nucleating agents, optionally contained in the inventive, molded polyolefin parts, preferably are a-nucleating agents, such as talcum, sodium benzoate or the sodium salt of methylene-bis(2,4-di-t-butylphenol) phosphoric acid or P-nucleating agents, such as adipic acid, adipic dianilide, quinacridinonequinone and/or N,N'dicyclododecyl-4,4-biphenyldicarboxamide.

The fillers, optionally contained in the inventive molded polyolefin parts preferably are $Al_2O_3$, $Al(OH)_3$, barium sulfate, calcium carbonate, glass beads, wood flour, silica, hollow microspheres, carbon black, talcum and/or wollastonite.

The reinforcing materials, optionally contained in the inventive molded polyolefin parts, preferably are aramide fibers, cellulose fibers, flax, jute, hemp, glass fibers, glass mats, microfibers of liquid crystalline polymers and/or polytetrafluoroethylene fibers.

The inventive molded polyolefin parts may contain calcium stearate, magnesium stearate and/or waxes as processing aids.

Pursuant to the invention, the modified propylene polymers B, contained in the molded polyolefin parts, are modified propylene homopolymers and/or propylene copolymers with melt indexes of 0.05 to 40 g/10 min at 230° C./2.16 kg and preferably of 0.25 to 15 g/10 min at 230° C./2.16 kg and a ratio of the intrinsic viscosity of the modified propylene polymer B to the intrinsic viscosity of the basic, unmodified propylene polymer of largely the same weight average molecular weight of 0.20 to 0.95, the following modified propylene polymers B being suitable pursuant to the invention from the point of view of the synthesis method:

B1) modified propylene polymers, which were synthesized by the treatment of propylene homopolymers and/or copolymers of propylene and ethylene or α-olefins with 4 to 18 carbon atoms, as well as of mixtures of said polypropylenes
  with multifunctional, ethylenically unsaturated monomers
  and/or with ionizing radiation or thermally decomposing free radical-forming agents, and/or B2) modified propylene polymers, which were synthesized by the reaction of functionalized polypropylenes, preferably of polypropylenes containing acid and/or anhydride groups, with multifinctional compounds of opposite reactivity, preferably with $C_2$ to $C_{16}$ diamines and/or $C_2$ to $C_{16}$ diols, and/or B3) modified propylene polymers, which were synthesized by the hydrolytic condensation of polypropylenes, which contain hydrolyzable silane groups.

Examples of modified propylene polymers B1), optionally contained in the inventive molded polyolefin parts, are, in particular:

polypropylenes modified by the reaction of polypropylenes with bismaleimido compounds in the melt (EP 574 801; EP 574 804), polypropylenes modified by the treatment of polypropylenes with ionizing radiation in the solid phase (EP 190 889; EP 634 454), polypropylenes modified by the treatment of polypropylenes with peroxides in the solid phase (EP 384 431; DE 4340194) or in the melt (EP 142 724).

polypropylenes modified by the treatment of polypropylenes with multifunctional, ethylenically unsaturated monomers under the action of ionizing radiation (EP 678 527), polypropylenes modified by the treatment of polypropylenes with multifunctional, ethylenically unsaturated monomers in the presence of peroxides in the melt (EP 688 817; EP 450 342).

Examples of modified propylene polymers B2), produced by polymerlike reactions and optionally contained in the inventive, molded polyolefin parts, are, in particular:

polypropylenes modified by reacting polypropylenes, grafted with maleic anhydride, with diamines or polyglycols (EP 177 401; JP 08 176 365), polypropylenes, modified by reacting polypropylenes, containing acid or acid anhydride groups, with polymers containing epoxy, hydroxy or amino groups (EP 307 684; EP 299 486)

The products, described in the German patent 41 07 635 or in the U.S. Pat. No. 4,714,716 are examples of modified propylene polymers B3), which are optionally contained in the inventive, molded polyolefin parts and produced by hydrolytic condensation of polypropylenes, which contain hydrolyzable silane groups.

An especially preferred variation of the modified propylene polymers B1, optionally contained in the inventive molded polyolefin parts and produced by treatment of propylene homopolymers and/or copolymers of propylene and ethylene or α-olefins with 4 to 18 carbon atoms as well as of mixtures of said polypropylenes with multifunctional, ethylenically unsaturated monomers and thermally decomposing free radical-forming agents, are modified propylene polymers B1, which were synthesized by a continuous method, in which the 1) polypropylene particles, in the form of powders, granulate or gravel, with a preferred particle size ranging from 0.001 to 7 mm, which 1.1) were prepared from propylene homopolymers, particularly from propylene homopolymers with a bimodal weight distribution, weight average molecular weights $M_w$ of 500,000 to 1,500,000 g/mole, number average molecular weights $M_n$ of 25,000 to 100,000 g/mole and $M_w/M_n$ values of 5 to 60, which were synthesized in a reactor cascade using Ziegler-Natta or metallocene catalysts, and/or from 1.2) copolymers of propylene and ethylene or α-olefins with 4 to 18 carbon atoms, preferably from random propylene copolymers, propylene block copolymers, random propylene block copolymers and/or elastomeric polypropylenes or from mixtures of said modified polypropylenes, were mixed in a continuous mixer with 0.05 to 3% by weight, based on the polypropylenes used, of acyl peroxides, alkyl peroxides, hydroperoxides, peroxycarbonates and/or peresters as thermally decomposing free radical-forming agents, the thermal decomposition of which preferably is concluded at a temperature below 210° C. and which are optionally diluted with inert solvents, with heating to 30° to 100° C. and preferably 70° to 90° C., 2) readily volatile, bifunctional monomers, particularly $C_4$ to $C_{10}$ dienes and/or $C_7$ to $C_{10}$ divinyl compounds, are absorbed by the polypropylene particles from the gas phase, preferably in continuous flow mixers as a continuous gas-solid absorber, at a temperature T of 20° to 120° C. and preferably of 60° to 100° C. and an average absorption time $t_s$ of 10 seconds to 1,000 seconds and preferably of 60 seconds to 600 seconds, the proportion of bifunctional, unsaturated monomers in the polypropylene particles being 0.01 to 10% by weight and preferably 0.05 to 2% by weight, based on the polypropylenes used, subsequently 3) the polypropylene particles, in which the acyl peroxides, alkyl peroxides, hydroperoxides, peroxycarbonates and/or peresters have been absorbed as thermally decomposing free radical-forming agents and the bifunctional, unsaturated monomers have been absorbed, are melted under an atmosphere of an inert gas and of these readily volatile, bifunctional monomers at 110° to 210° C. in continuously operating kneaders or extruders, preferably in twin screw extruders, the thermally decomposing free radical-forming agents being decomposed at the same time, 4) the melt is then heated to 220° to 300° C., the unreacted monomers and decomposition being removed, and 5) the melt is granulated in a known manner, and for which, before steps 1) and/or 5) of the process and/or before or during steps 3) and/or 4) of the process, 0.01 to 2.5% by weight of stabilizers, 0.1 to 1% by weight of antistatic agents, 0.2 to 3% by weight of pigments, 0.05 to 1% by weight of nucleating agents and/or 0.01 to 5% by weight of processing aids, based on the polypropylene used, are added as further auxiliary materials.

It is especially preferred if the inventive molded polyolefin parts contain, as modified propylene polymers B, modified propylene polymers with a weight average molecular weight of 350 to 1,500 kg/mole and an equilibrium compliance $J_{e0}$ of 1.2 to 12 $Pa^{-1}$.

The higher crystallization temperature is a further advantage of the inventive molded polyolefin parts.

The molded polyolefin parts, produced by blow molding, preferably are bottles, boxes, container ;, liquid containers, parts that supply liquids, parts that supply air, internal containers, tanks, folding bellows, covers, housings, connecting pieces, pipes and/or transporting suitcases. Large capacity, blow molded parts, with a capacity of 5 to 200 L or foamed, molded polyolefin parts with foam densities of 300 to 700 kg/m³ are especially preferred.

The molded polyolefin parts, produced by injection molding, preferably are packaging, pharmaceutical and food packaging, as well as transporting containers, components of the automobile industry and of machinery, household appliances and electronic and electric implements being particularly preferred.

According to one method, the molded polyolefin parts of improved thermal stability at elevated temperatures and improved stiffness are produced by melting and homogenizing mixtures of 60 to 99.9% by weight and preferably 75 to 98% by weight of unmodified propylene polymers A and 40 to 0.1% by weight and preferably of 25 to 2% by weight of modified propylene polymers B in kneaders, preferably in plasticizing units using screws with an L/D of 15 to 33 at temperatures of 180° to 300° C., the molten mixtures 1) being extruded through annular dies as a tubular parison, molded into a hollow object by being blown into a divided blowing mold, kept at a temperature of 10° to 55° C. and optionally subjected in a second blowing mold to an additional longitudinal stretching by a stretching stamp and to further radial stretching by blown air, or 2) being injected into an injection mold, heated to 20° to 130° C., to produce the parison and, after being removed and optionally preferably separate heating of the parison in a conditioning mold to temperatures of 80° to 160° C., especially with a first premolding by blowing, transferred into the blowing mold and by blowing, molded into the hollow body, optionally preferably with additional longitudinal stretching by a stretching stamp, or 3) being processed in injection molding machines, preferably with three-zone screws with a screw length of 18 to 24 D, optionally after cooling and granulating at mass temperatures of 200° to 300° C. and preferably of 240° to 270° C., high injection speeds and mold temperatures of 5° to 70° C. and preferably of 20° to 50° C., into injection molded parts.

The unmodified propylene polymers A consist of

A1) conventional propylene polymers, preferably polypropylene homopolymers, which are synthesized using Ziegler-Natta catalysts or metallocene catalysts and, in particular, have an $M_w/M_n$ ratio of 2 to 4.5 and/or copolymers of propylene, ethylene and/or α-olefins with 4 to 18 carbon atoms with a propylene content of 80.0 to 99.9% by weight in the form of random copolymers, block copolymers and/or random block copolymers, with melt indexes of 0.1 to 300 g/10 min. at 230° C./2.16 kg and preferably of 1 to 100 g/10 min. at 230° C./2.16 kg, and/or A2) a polyolefin mixture with an $M_w/M_n$ ratio of 2 to 6 and a melt index of 1 to 40 g/10 min. at 230° C./2.16 kg, which consists of A2.1) 60 to 98% by weight of a crystalline copolymer of 85 to 99.5% by weight of propylene and 15 to 0.5% by weight of ethylene and/or an α-olefin of the general formula $CH_2=CHR$, in which R is a linear or branched alkyl group of 2 to 8 carbon atoms, A2.2) 2 to 40% by weight of an elastic copolymer of 20 to 70% by weight of ethylene and 80 to 30% by weight of propylene and/or an α-olefin of the general formula $CH_2=CHR$, in which R is a linear or branched alkyl group with 2 to 8 carbon atoms, and/or A3) largely amorphous polypropylenes or propylene copolymers containing less than 10% by weight of crystalline polypropylene or crystalline propylene copolymer with a melting enthalpy of less than 40 J/g and a melt index of 0.1 to 100 g/10 min. at 230° C./2.16 kg, the largely amorphous polypropylene being a homopolymer of propylene and/or a copolymer of propylene consisting of at least 80 mole percent of propylene and not more than 20 mole percent of one or more α-olefins of the general formula $CH_2=CHR$, in which R is a linear or branched alkyl group with 2 to 8 carbon atoms and/or A4) non-isotactic propylene homopolymers with a melting point of 145° to 165° C., a melt viscosity in excess of 200,000 cps at 190° C. and a heat of crystallization of 4 to 10 cal/g, 35% to 55% by weight being soluble in diethyl ether.

Moreover, the unmodified propylene polymers A may contain 0.01 to 2.5% by weight of stabilizers, 0.01 to 5% by weight of processing aids, 0.1 to 1% by weight of antistats, 0.2 to 3% by weight of pigments, 0.05 to 1% by weight of nucleating agents, 2 to 20% by weight of flame retardants, in each cased based on the sum of the unmodified propylene polymers A, as auxiliary materials, and/or 3 to 40% by weight, based on the sum of the unmodified propylene polymers A, of inorganic and/or organic fillers and reinforcing materials.

Pursuant to the invention, the modified propylene polymers B are modified propylene homopolymers and/or propylene copolymers with melt indexes of 0.05 to 40 g/10 min. at 230° C./2.16 kg and preferably of 0.25 to 15 g/10 min. at 230° C./2.16 kg and the ratio of the intrinsic viscosity of the modified propylene polymer B to that of the basic unmodified propylene polymer of largely the same weight average molecular weight is 0.20 to 0.95.

In relation to the synthesis method, the modified propylene polymers B are

B1) modified propylene polymers, which are synthesized by the treatment of propylene homopolymers and/or copolymers of propylene and ethylene or α-olefins with 4 to 18 carbon atoms as well as mixtures of said polypropylenes with multifunctional, ethylenically unsaturated monomers and/or with ionizing radiation or thermally decomposing free radical-forming agents and/or B2) modified propylene polymers, which were synthesized by the reaction of functionalized polypropylenes, preferably of polypropylenes containing acid and/or acid anhydride groups, with multifunctional compounds of opposite reactivity, preferably with $C_2$ to $C_{16}$ diamines and/or $C_2$ to $C_{16}$ diols, and/or B3) modified propylene polymers, which were synthesized by the hydrolytic condensation of polypropylenes, which contain hydrolyzable silane groups.

For variation 1) of the inventive method, the tubular parison of the polyolefin mixture is transferred with separation of the tube to the cooled blowing mold, which is in a closing unit for moving the parts of the blowing mold together or apart. The segmented parison is molded into the blow-molded part with the blowing mold closed by compressed air at a pressure of 5 to 10 bar. For producing large-volume, blow-molded parts from the polyolefin mixture, the parison has to be stretched and possibly pre-blown when the mold is still open. The blow-molded polyolefin parts are demolded by opening the divided mold.

A further improvement in the strength and transparency of the blow-molded parts according to variation 1) of the inventive method can be achieved by an additional stretching of blow-molded preform in a second blowing mold by a stretching stamp in the longitudinal direction in a first step and in the radial direction by blown air in a second step before demolding the blow-molded polyolefin part.

For variation 2) of the inventive method of preparing blow-molded polyolefin parts, the plasticizing unit, as in the case of injection machines, consists of a plasticizing cylinder with several heating zones, in which a rotatable screw, preferably in the form of three-zone screw, acts as piston. The polyolefin mixture is melted at 180° to 260° C. and, for producing the parison, injected into the injection mold that has been heated to 20° to 130° C. After removal of the parison from the injection mold and transfer into the blowing mold, molding into the blow-molded polyolefin part by compressed air at a pressure of 5 to 10 bar takes place with the blowing mold closed. Multi-station machines, for which the process steps of injection molding and heating the parison, blow molding the molded polyolefin part and ejecting the molded polyolefin part are controlled in time by swiveling processes of a turning table, are advantageous for the production of blow-molded polyolefin parts from the polyolefin mixtures.

Pursuant to the invention, a further improvement in the strength and transparency of the blow-molded polyolefin parts can be achieved by variation 2) of the method by stretching the parison or the blow-molded parison additionally during the manufacturing process. In the case of injection stretch blow molding in discontinuous plants, the injection molded parisons are transferred discontinuously to stretch blowing stations and heated in a conditioning mold to a stretching temperature of 80° to 160° C. At the same time, preliminary shaping can take place due to the blowing. Subsequently, in the blowing mold, the parisons are subjected to longitudinal stretching by a stretching stamp and molded into the blow-molded polyolefin part by compressed air at a pressure of 10 to 30 bar. In continuous multistation equipment, the four steps of the method are controlled by swiveling a turning table in each case through 90°. Conditioning molds, with divided heating zones, which are adapted to the wall thicknesses of the blow-molded polyolefin parts from the polyolefin mixtures, Are advantageous.

If blowing agents are used as auxiliary materials in the polyolefin mixtures in the case of the inventive method for producing blow-molded polyolefin parts, foamed, blow-molded polyolefin parts result with foam densities of 300 to 700 kg/m$^3$. In particular, bowing agents that emit a gas, such as sodium hydrogen carbonate, azodicarbonamide and/or cyanuric trihydrazide are suitable blowing agents.

The inventive method of producing blow-molded polyolefin parts from polyolefin mixtures can be combined in mechanical equipment with the further steps of printing the blow-molded polyolefin part, filling the blow-molded polyolefin part with liquid media or porable goods, closing the blow-molded filled polyolefin part and ejecting the filled and printed blow-molded polyolefin part as a packaging method.

For variation 3) of the inventive method, the polyolefin mixtures of unmodified propylene polymers A) and modified propylene polymers B) can be added as granulate mixture or as a bland blend to the injection molding machine. When added as a blend, the granulate mixture is prehomogenized in a continuous kneader.

The injection speed during the manufacture of molded polyolefin parts produced by injection molding should be set as high as possible, in order to exclude sink marks and bad flow lines in the molded polyolefin parts.

Preferably, for the inventive method of producing molded polyolefin parts of high stiffness and toughness, injection molding machines with injection zones are used, which have three-zone screws with a screw length of 18 to 24 D.

A further advantage of the inventive method consists therein that, because of the high stiffness and toughness of the inventive polyolefin parts, produced by injection molding, the wall thickness and article weight can be reduced while the material properties are similar to those of standard injection molded polypropylene parts. Furthermore, the processing cycle times can be shortened because of a reduction in the cooling time and because of the higher demolding temperatures.

The inventive molded polyolefin parts are suitable particularly for use in the packaging industry, in the domestic appliances industry, for laboratory and hospital requirements, for gardening and agricultural implements, as transporting containers as well as for components in the automobile industry and of machinery, electric and electronic equipment.

A preferred area of use of the inventive, blow-molded polyolefin parts is in the packaging industry, especially for bottles for foods, such as cooking oil, sauces, juices and syrup, for household chemicals, such as fabric softeners, detergents and bleaches, for oils, such as engine oil or lubricating oil and for cosmetics and pharmaceuticals, as well as for transporting suitcases with true-to-shape inserts.

Blow-molded multilayer composites of the polyolefin mixtures and hydrolyzed ethylene/vinyl acetate copolymers, polyamide or polyethylene terephthalate are used as barrier layer polymers when the barrier layer properties of blow-molded polyolefin parts for food packaging must meet special requirements, as in the bottles for ketchup salad dressing and mayonnaise.

A further preferred area of use of blow-molded polyolefin parts is the motor vehicle industry, in which blow-molded parts are used especially as air intake fittings and manifolds for air filters, air ducts for heating and air conditioning, brake fluid containers, window washer containers, overflow containers for radiators, pressure equalizing containers, expansion bellows, timing chain covers, spiral pipes and defroster nozzles.

Further preferred uses of blow-molded polyolefin parts lie in the domestic appliances industry, for which the inventive blow-molded polyolefin parts are used especially as liquid containers for washing machines, dishwashers, coffee machines and steam irons, as liquid supplying parts for washing machines and dishwashers, as air supplying parts for clothes dryers as well as internal parts for electric hot-water heaters.

Preferred applications of blow-molded polyolefin parts also include laboratory and hospital requirements, motorized garden and agricultural implements, parts of solar collectors and housings for electric and electronic equipment.

The molded polyolefin parts, produced by injection molding, are suitable preferably for packaging, especially for the packaging of pharmaceuticals and foods, for transporting containers, as well as for components in the automobile industry and components of machines, domestic appliances and electrical and electronic equipment.

The invention is explained by the following examples.

EXAMPLE 1

Preparation of Modified Propylene Polymers B1

A powdery polypropylene homopolymer, with a melt index of 0.2 g/10 min. at 230° C./2.16 kg and an average particle diameter of 0.55 mm, is added continuously to a continuously heatable continuous mixer. Moreover, 0.1% by weight of calcium stearate and 0.09% of bis(t-butyl-peroxy)-2,5-dimethylhexane, in each case based on the polypropylene homopolymer, is added continuously to the continuous mixer. While being mixed homogeneously at 45° C., the polypropylene homopolymer, charged with a thermally decomposing free radical-forming agent and auxiliary material, is charged absorptively by a butadiene-nitrogen mixture with 0.28% by weight of butadiene, based on the polypropylene homopolymer. After being transferred to a twin screw extruder, the powdery reaction mixture, in contact with the butadiene-nitrogen mixture that has been added, is melted with the addition of 0.1% by weight of tetrakis(methylene(3,5-di-t-butyl hydroxyhydrocinnamate) methane and 0.1% by weight of tris(2,4-di-t-butylphenyl) phosphite) at a mass temperature of 235° C. and, after a rough degassing, is subjected to a fine degassing with addition of water as entraining agent, discharged and granulated.

The resulting modified polypropylene contains 0.2% by weight of bound butadiene, as determined by IR spectroscopy, and has a melt index of 2.5 g/10 min. at 230° C./2.16 kg.

Preparation of the Polyolefin Mixture

A mixture of
B1) 15% by weight of a modified polypropylene, containing 0.20% by weight of bound butadiene, as determined by IR spectroscopy, and having a melt index of 2.5 g/10 min. at 230° C./2.16 kg,
A1) 55% by weight of a polypropylene copolymer, with a melt index of 5.5 g/10 min. at 230° C./2.16 kg, a density of 0.905 g/cc at 23° C. and an ethylene content of 4.2% by weight,
A2) 30% by weight of a reactor blend, with an ethylene content of 33 mole percent, a melt index of 5 g/10 min. at 230° C./2.16 kg, and consisting of a crystalline propylene-ethylene copolymer and elastic ethylene-propylene copolymer
as well as 0.1% by weight of tetra-kis(methylene(3,5-di-t-butyl hydroxyhydrocinnamate))methane and 0.1% by weight of tris-(2,4-di-t-butyl-phenyl)phosphite, in each case based on the total amount of polyolefins,
is melted in a Werner & Pfleiderer ZSK 84 twin screw extruder with a temperature profile of 100°/145°/185°/210°/220°/220°/200°/185° C., homogenized, discharged and granulated. The resulting polyolefin compound has a melt index of 11.5 g/10 min. at 230° C./2.16 kg and a density of 0.92 g/cc at 23° C.

Production of A Detergent Container Resistant to Stress Cracks

In injection stretch blowing equipment comprising a plasticizing unit with a three-zone screw, a turning table with a quadruple injection mold, a conditioning mold with three heating zones, a blowing mold with a stretching stamp and ejection equipment, the polyolefin compound, with a melt index of 11.5 g/10 min at 230° C./2.16 kg and a density of 0.92 g/cc at 23° C., is melted in the plasticizing unit at a temperature profile of 110°/170°/210°/220°/220° C. and injected into the quadruple injection mold, which had been heated to 125° C. The parison, weighing 27 g and having a wall thickness of 4 to 5 mm, a height of 98 mm and an external diameter of 30.5 mm, is taken by the mandrel of the turning table from the injection mold and brought by a swiveling motion of 90° of the turning table into the electrically heated conditioning mold, the heating zones of which are adjusted to a temperature of 142° C. (bottom of the bottle parison), of 145° C. (center part of the bottle parison) and of 142° C. (upper part of the bottle parison). After a conditioning period of 75 seconds, pre-blow-molding by compressed air is followed by removal of the blow-molded preform and transferal by means of the mandrel of the turning table by the swiveling motion of the turning table through 90° into the blowing mold, where the blow-molded preform initially is subjected to longitudinal stretching by the stretching stamp and subsequently molded by compressed air at a pressure of 18 bar. The longitudinal stretching of the preform in the blowing mold is 3.0 : 1 and the radial stretching of the preform is 2.2 : 1. After 6.5 seconds, the blow-molded detergent container is removed from the open blowing mold, supplied by the swiveling motion of the turning table through 90° to the ejector and ejected. It was possible to produce 812 detergent bottles in the period of one hour.

To determine the material properties, test pieces were stamped out after the container shell was cut open. The wall thickness 50 mm above the bottom of the bottle was 2.03±0.04 mm. The resistance to stress cracking, as measured by the ASTM D-1693-97 test (Bell test, 5% Leventine solution, test temperature 50° C.), exceeded 1000 hours. When the dimensional stability at elevated temperatures was determined by the Vicar B (ISO 306) method, a softening temperature of 85° C. was determined. The Schuch transparency (scatter S2*) is 84.5% and the haze value (ASTM D-1003-92) is 39.9. The limiting temperature for filling the container with a hot material without deformation is 90° C.

EXAMPLE 2

Comparison Example

A blend of
A1) 70% by weight of a polypropylene copolymer, with a melt index of 5.5 g/10 min at 230° C./2.16 kg, a density of 0.905 g/cc at 23° C. and an ethylene content of 4.2% by weight,
A2) 30% by weight of a reactor blend, with an ethylene content of 33 mole percent and a melt index of 5 g/10 min at 230° C./2.16 kg and consisting of a crystalline propylene-ethylene copolymer and an elastic ethylene-propylene copolymer,
as well as 0.1% by weigh of tetra-kis(methylene(3,5-di-t-butyl hydroxyhydrocinnamate))methane and 0.1% by weight of tris-(2,4-di-t-butyl-phenyl) phosphite, in each case based on the total weight of polyolefins A1) and A2), was processed under the conditions of Example 1 into a blend, with a melt index of 10.2 g/10 min at 230° C./2.16 kg and a density of 0.92 g/cc at 22° C., from which the container was produced.

Due to inhomogeneities in wall thickness, especially in the filling area, there were repeated production failures and stoppages, so that it was possible to produce only 448 detergent bottles per hour.

To determine the material properties, test pieces were stamped out after the container shell was cut open. The wall thickness 50 mm above the bottom of the bottle was 2.06±0.18 mm. The resistance to stress cracking, as measured by the ASTM D-1693-97 test (Bell test, 5% Leventine solution, test temperature 50° C.), exceeded 1000 hours. When the dimensional stability at elevated temperatures was determined by the Vicat B (ISO 306) method, a softening temperature of 84° C. was determined. The Schuch transparency (scatter S2*) is 85.8% and the haze value (ASTM D-1003-92) is 25.9. The limiting temperature for filling the container with a hot material without deformation is 85° C.

EXAMPLE 3

Comparison Example

A blend of high density polyethylene with a melt index of 32 g/10 min at 190° C./2.16 kg and a density of 0.959 g/cc at 23° C., 0.1% by weight of tetrakis(methylene(3,5-di-t-butyl hydroxyhydrocinnamate))methane and 0.1% by weight of tris-(2,4-di-t-butyl-phenyl) phosphite, in each case based on the high density polyethylene, was melted in the injection stretch blowing equipment of Example 1 at a temperature profile of 100°/160°/200°/210°/205° C. and injected into the quadruple injection mold heated to 100° C. The parison weighing 27 g and having a wall thickness of 4 to 5 mm and a height of 97 mm and an external diameter of 30.1 mm is taken by tie mandrel of the turning table and by the swiveling motion of the turning table through 90° into the electrically heated conditioning mold, the heating zones of which are adjusted to 122° C. (bottom of the bottle parison), 128° C. (center part of the bottle parison) and 122° C. (upper part of the bottle parison). A conditioning period of 75 seconds was followed by a pre-blow-molding by compressed air, removal of the blow-molded preform and transfer by means of the mandrel of the turning table by the swiveling motion of the turning table through 90° into the blowing mold, where the blow-molded preform initially is subjected to a longitudinal stretching by the stretching stamp and subsequently molded by compressed air at a pressure of 18 bar. The longitudinal stretching of the preform in the blowing mold is 3.0 : 1 and the radial stretching 2.2 : 1. The blow-molded container is removed after 6.5 seconds from the opened blowing mold, supplied by the swiveling motion of the turning table through 90° to the ejector and ejected. In a period of one hour, it was possible to manufacture 825 bottles.

To determine the material properties, the container shell was cut open and test pieces were stamped out. The wall thickness 50 mm above the bottom of the bottle was 2.06±0.12 mm. The resistance to stress cracking, as measured by the ASTM D-1693-97 test (Bell test, 5% Leventine solution, test temperature 50° C.), exceeded 100 hours, then the dimensional stability at elevated temperatures was determined by the Vicat B (ISO 306) method, a softening temperature of 75° C. was determined. The Schuch transparency (scatter S2*) is 63%. The limiting temperature for filling the container with a hot material without deformation was 65° C. The bottles could not be used as detergent containers nor filled with a hot material.

EXAMPLE 4

Synthesis of the Modified Propylene Polymer B3

An unstablized polypropylene powder (2,250 g), with a particle diameter of 50 to 250 $\mu$m, a specific surface area of $4 \times 10^{-2}$ m$^2$/g and a melt index of 0.5 g/10 min at 230° C./2.16 kg, was transferred into a heated stainless steel reactor, with a capacity of 12 L, which is installed in gamma radiation equipment of the gamma beam type. After the heating is switched on, the stainless steel reactor is flushed several times with argon. Subsequently, 28 g of vinyltriethoxysilane is added to the reactor, which is then heated to 130° C. The source of radiation is then placed in the irradiating position and irradiation is carried out at an output of 55 krad/h. After irradiating for 40 minutes, the absorbed gamma radiation dose amounts to 36.6 krad. After the radiation source is lowered into the source container, the stainless reactor is cooled to room temperature and the vinyltriethoxysilane-grafted polypropylene is dried under vacuum for one hour at 140° C.

The resulting modified polypropylene contains 1.1% of bound vinyltriethoxysilane, as determined by IR spectroscopy, and has a melt index of 1.95 g/10 min at 230° C./2.16 kg.

Preparation of the Polyolefin Mixture

A mixture of
B3) 20% by weight of a modified polypropylene with a bound vinyltriethoxysilane content of 1.1%, as determined by IR spectroscopy, and a melt index of 1.65 g/10 min at 230° C./2.16 kg,
A1) 70% by weight of a polypropylene copolymer, with a melt index of 1.2 g/10 min at 230° C./2.16 kg, a density of 0.905 g/cc at 23° C. and an ethylene content of 8.3% by weight,
A3) 5% by weight of An amorphous polypropylene block copolymer, with a melt index of 1.2 g/10 min at 230° C./2.16 kg, a density of 0.91 g/cc at 23° C. and an ethylene content of 10.5% by weight,
A4) 5% by weight of a nonisotactic propylene homopolymer with a melt index of 1.5 g/10 min at 230° C./2.16 kg and adensity of 0.91 g/cc at 23° C.
as well as 0.1% by weight of tetra-kis(methylene(3,5-di-t-butyl hydroxyhydrocinnamate))methane, 0.1% by weight of tris-(2,4-di-t-butylphenyl) phosphite and 0.2% by weight of dibutyl tin dilaurate, in each case based on the total weight of the polyolefins,
is melted in a ZSK 84 Werner & Pfleiderer twin screw extruder with a temperature profile of 100°/145°/185°/210°/220°/220°/200°/185° C., homogenized, discharged and granulated.

The resulting polyolefin compound has a melt index of 1.3 g/10 min at 230° C./2.16 kg and a density of 0.91 g/cc at 23° C.

Production of Timing Chain Covers

In an extrusion blow molding installation, comprising a plasticizer extruder with a grooved feed section, a three-zone screw, L/D =22, a 6-fold accumulator parison die and six parison dies for timing chain covers, the polyolefin compound, with a melt index of 1.3 g/10 min at 230° C./2.16 kg, is melted at a temperature profile of the plasticizing extruder of 110°/175°/200°/220°/210°/210° C. and transferred over the multiple accumulator parison die as tubular parison to the parison dies, which are heated to 55° C., and in which the parison for the timing chain cover is molded by forcing in compressed air.

The timing chain cover, with a wall thickness of 4 mm and a weight of 800 g, shows no deformation after a thermal shock treatment by exposure for 10 minutes to hot steam at 145° C. Test pieces, stamped out, had a softening temperature of 86° C. during the test for dimensional stability at elevated temperatures (Vicat B, ISO 306).

EXAMPLE 5

Comparison Example

Mixtures of 100% by weight of a polypropylene copolymer A1), with a melt index of 2.5 g/10 min at 230° C./2.16 kg, a density of 0.905 g/cc at 23° C. and an ethylene content of 4.2% by weight, 0.1% by weight of tetra-kis(methylene (3,5-di-t-butylhydroxy hydrocinnamate)methane and 0.1% by weight of tris(2,4-di-t-butylphenyl)phosphite, in each case based on the polypropylene copolymer used, are processed into a blend under the conditions of Example 4. The further processing in the extrusion blow molding installation for timing chain covers, as in Example 4, failed because of the drawdown and tearing open during the demolding of the parisons.

EXAMPLE 6

Comparison Example

A blend of polyethylene of high density, with a melt index of 32 g/10 min at 190° C./2.16 kg, a density of 0.959 g/cc at 23° C., 0.1% by weight of tetrakis(methylene(3,5-di-t-butyl hydroxyhydrocinnamate)methane and 0.1% by weight of tris(2,4-di-t-butylphenyl) phosphate, in each case based on the high density polyethylene, is melted in the extrusion blow molding equipment of Example 4 at a temperature profile of the plasticizing extruder of 190°/155°/185°/200°/200°/190° C. and transferred over the multiple accumulator parison die as a tubular parison to the blowing molds, in which it is molded into a blank for the timing chain cover.

After a thermal shock treatment by a 10 minutes exposure to steam at 145° C., the timing chain cover, which has a wall thickness of 4 mm and a weight of 870 g, already shows severe deformation in the edge regions. The softening temperature was determined to be 75.5° C. when the stability at elevated temperatures was evaluated by the Viat B (ISO 306) method.

EXAMPLE 7

Preparation of the Modified Propylene polymer B1

A powdery, random polypropylene copolymer, with a melt index of 0.85 g/10 min at 230° C./2.16 kg, an average particle diameter of 0.85 mm and an ethylene content of 4.8 by weight, is added continuously to a continuous, heated mixer. Furthermore, 0.05% by weight of hydrotalcit, 0.05% by weight of calcium stearate and 0.45% by weight of t-butyl peroxybenzoate, in each cased based on the polypropylene copolymer, are added continuously to the continuous mixer. While being mixed homogeneously at 70° C., the polypropylene copolymer, charged with the thermally decomposing free radical-forming agent and auxiliary material, is charged by adsorption from the divinylbenzene and nitrogen mixture flowing in, during a residence time of 4 minutes at 70° C., with 0.25% by weight of divinylbenzene, based on the polypropylene copolymer. After being transferred to the twin screw extruder, the powdery reaction mixture, in contact with the mixture of divinylbenzene and nitrogen, which has been added, and with addition of 0.1% by weight of tetrakis(methylene(3,5-di-t-butyl hydroxyhydrocinnamate)methane and 0.1% by weight of tris(2,4-di-t-butylphenyl) phosphite, is melted at a mass temperature of 225° C. and, after a rough degassing, is subjected to a fine degassing with addition of water as entraining agent, discharged and granulated.

The resulting, modified polypropylene copolymer contains 0.19% by weight of bound divinylbenzene, as determined by IR spectroscopy, and has a melt index of 1.65 g/10 min at 230° C./2.16 kg.

Manufacture of 10 L Canister

A granulate mixture of
B1) 15% by weight of Pa modified polypropylene copolymer, containing 0.19% by weight of bound divinylbenzene and having a melt index of 1.65 g/10 min at 230° C./2.16 kg,
A1) 85% by weight of a polypropylene copolymer, with a melt index of 1.5 g/10 min at 230° C./2.16 kg and an ethylene content of 4.8% by weight,
onto which 0.15% by weight of 5,7-di-t-butyl-3-(3,4-dimethylphenyl)3H-2-benzofuranone and 0.15% by weight of bis-2,2,6,6-tetramethyl-4-piperidyl sebacate are drummed in a kneader was melted in a Fischer & Müller BFB 1–6 blow molding machine at a mass temperature of 188° C., revolving at 60 rpm, extruded into a tube and subsequently molded in a blowing mold, maintained at 20° C. with compressed air into a 10 L Europe canister with a net weight of 380 g. The cycle time was 30.2 seconds.

In the dropping test of the water-filled canister at 23° C., there was no breakage up to a height of 2.6 m.

For determining the material properties, test pieces were prepared by cutting open the container jacket and stamping out. The wall thickness in the side wall area, 150 mm below the filling opening, was 1.85±0.15 mm. The ASTM D-1693-97 (Bell test, 5% Leventine solution, test temperature 50° C.) resistance to stress cracks exceeded 1000 hours. The softening temperature was determined to be 85.5° C. when the stability at elevated temperatures was evaluated by the Vicat B (ISO 306) method. The limiting temperature for filling the container with hot material without deformation was 90° C. The Schuch transparency (scatter S2*) is 83.1% and the haze value (ASTM D-1003-92) is 49.8%.

EXAMPLE 8

Comparison Example

A granulate of a polypropylene copolymer A1), with a melt index of 1.5 g/10 min at 230° C./2.16 kg and an ethylene content of 4.8% by weight, onto which 0.15% by weight of 5,7-di-t-butyl-3-(3,4-dimethylphenyl)3H-2-benzofuranone and 0.15% by weight of bis 2,2,6,6-tetramethyl-4-piperidyl sebacate are drummed in the kneader, was processed under conditions corresponding to those of Example 7.

A fully molded canister could not be produced, since there was severe drawdown with subsequent partial tearing off of the extruded tube.

EXAMPLE 9

Comparison Example

A blend of polyethylene of high density, with a melt index of 6.5 g/10 min at 190° C./2.16 kg and a density of 0.953 g/cc at 23° C., 0.15% by weight of tetrakis(methylene(3,5-di-t-butyl hydroxyhydrocinnamate)methane and 0.10% by weight of tris(2,4-di-t-butylphenyl) phosphite, in each case based on the high density polyethylene, was melted in a blow molding of Example 7 at a mass temperature of 172° C. and a rotation of 60 rpm, extruded into a tube and subsequently molded in a blow molding tube, maintained at 18° C. with compressed air into a 10 L Europe canister with a net weight of 385 g. The cycle time was 29.8 seconds.

In the dropping test of the water-filled canister at 23° C., there was no breakage up to a height of 3 m.

For determining the material properties, test pieces were prepared by cutting open the container jacket and stamping out. The wall thickness in the side wall area, 150 mm below the filling opening, was 1.85±0.15 mm. The ASTM D-1693-97 (Bell test, 5% Leventine solution, test temperature 50° C.) resistance to stress cracking was 130 hours. The softening temperature was determined to be 74° C. when the dimensional stability at elevated temperatures was evaluated by the Vicat B (ISO 306) method. The limiting temperature for filling the container with a hot material without deformation was 65° C. The Schuch transparency (scatter s2*) is 63%.

The canisters cannot be used as detergent containers or for holding hot materials.

EXAMPLE 10

Preparation of the Modified Propylene Polymer B1

A powdery polypropylene homopolymer, with a melt index of 0.2 g/10 min at 230° C./2.16 kg and an average particle diameter of 0.55 mm, is added continuously to a continuous, heated mixer. Furthermore, 0.1% by weight of calcium stearate and 0.09% by weight of bis(t-butylperoxy)-2,5-dimethylhexane, in each cased based on the polypropylene homopolymer, are added continuously to the continuous mixer. While being homogeneously at 45° C., the polypropylene homopolymer, charged with the thermally decomposing free radical-forming agent and auxiliary material, is charged by adsorption from a butadiene and nitrogen mixture, during a residence time of 6 minutes at 45° C., with 1.1% by weight of butadiene, based on the polypropylene homopolymer. After being transferred to the twin screw extruder, the powdery reaction mixture, in contact with the mixture of butadiene and nitrogen, which has been added, and with addition of 0.1% by weight of tetrakis (methylene(3,5-di-t-butyl hydroxyhydrocinnamate)methane and 0.1% by weight of tris(2,4-di-t-butylphenyl) phosphite, is melted at a mass temperature of 235° C. and, after a rough degassing, is subjected to a fine degassing with addition of water as entraining agent, discharged and granulated.

The resulting, modified polypropylene contains 0.8% by weight of bound butadiene, as determined by IR spectroscopy, and has a melt index of 2.5 g/10 min at 230° C./2.16 kg, a number average molecular weight of 489 kg/mole, an equilibrium compliance $J_{e0}$ of 4.08 at $10^{-3}$ $Pa^{-1}$ (creep experiment in conical plate geometry at 230° C.) and a crystallization point (DSC) of 128.5° C.

Preparation of Blends of Unmodified Propylene Polymers A and Modified Propylene Polymers B In a Collin laboratory twin screw extruder, with a screw diameter of 25 mm, a mixture of 99.0% by weight of a polypropylene homopolymer A1), with a melt index of 2.4 g/10 min at 230° C./2.16 kg, stabilized by 0.1% by weight of tetrakis(methylene(3,5-di-t-butyl hydroxyhydrocinnamate)methane and 0.1% by weight of tris(2,4-di-t-butylphenyl) phosphite and 1.0% by weight of a modified propylene polymer B1), containing 0.8% by weight of bound butadiene and having a melt index of 2.5 g/10 min at 230° C./2.16 kg, a number average molecular weight of 489 kg/mole and an equilibrium compliance of $J_{e0}$ of $4.08 \times 10^{-3}$ $Pa^{-1}$ (creep experiment in conical plate geometry at 230° C.) and a crystallization point (DSC) of 128.5° C., melted, homogenized at a mass temperature of 225° C. and a residence time of 25 seconds, is discharged over two round profile dies at a throughput of 2.4 kg/h, drawn off as two 3 mm thick strands and, after being solidified in the water bath, granulated. The granulate has a melt index of 2.1 g/10 min at 230° C./2.16 kg.

Preparation of Injection Molded Polyolefin Parts

The granulate prepared is processed in accordance with DIN 16774 in a Ferromatic Millacron FM 60 injection molding machine, which has a three-zone screw with a screw length of 22 D, at a mass temperature of 225° C. and a mold temperature of 50° C. into standard injection molded test rods.

The following properties were determined using the standard injection molded test rods:
modulus of elasticity: 1597 MPa (23° C., ISO 178)
notched impact strength of Charpy: 5.67 kJ/m² (23° C., ISO 179 1 eA)
crystallization point (DSC, ISO 3146): 124.5° C.

Standard injection molded test bars, produced entirely under the same conditions from the corresponding polypropylene homopolymer A1), which has a melt index of 2.4 g/10 min at 230° C./2.16 kg, stabilized by tetrakis (methylene(3,5-di-t-butyl hydroxyhydrocinnamate)methane and 0.1% by weight of tris(2,4-di-t-butylphenyl) phosphite have, for comparison, the following properties:
modulus of elasticity: 1517 MPa (23° C., ISO 178)
notched impact strength of Charpy: 5.11 kJ/m² (23° C., ISO 179 1 eA)
crystallization point (DSC, ISO 3146): 114.3° C.

EXAMPLE 11

Preparation of Blends of Unmodified Propylene Polymers A) and Modified Propylene Polymers B)

In a Collin laboratory twin screw extruder, with a screw diameter of 25 mm, a mixture of 95.0% by weight of a polypropylene homopolymer A1), a melt index of 2.4 g/10 min at 230° C./2.16 kg, stabilized by 0.1% by weight of tetrakis(methylene(3,5-di-t-butyl hydroxyhydrocinnamate) methane and 0.1% by weight of tris(2,4-di-t-butylphenyl) phosphite and 5.0% by weight of the modified propylene polymer B1) of Example 10, containing 0.8% by weight of bound butadiene and having a melt index of 2.5 g/10 min at 230° C./2.16 kg, a number average molecular weight of 489 kg/mole and an equilibrium compliance of $J_{e0}$ of $4.08 \times 10^{-3}$ $Pa^{-1}$ (creep experiment in conical plate geometry at 230° C.), and a crystallization point (DSC) of 128.5° C., is melted, homogenized at a mass temperature of 285° C. and a residence time of 28 seconds, discharged over two round profile dies at a throughput of 4.0 kg/h, drawn off as two 3 mm thick strands and, after being solidified in the water bath, granulated. The granulate has a melt index of 2.2 g/10 min at 230° C./2.16 kg.

Preparation of Injection Molded Polyolefin Parts

The granulate prepared is processed in accordance with DIN 16774 in a Ferromatic Millacron F 60 injection molding machine, which has a three-zone screw with a screw length of 22 D, at a mass temperature of 225° C. and a mold temperature of 50° C. into standard injection molded test rods.

The following properties were determined using the standard injection molded test rods:
modulus of elasticity: 1641 MPa (23° C., ISO 178)
notched impact strength of Charpy: 5.68 kJ/m² (23° C., ISO 179 1 eA)
crystallization point (DSC, ISO 3146): 126.4° C.

EXAMPLE 12

Preparation of the Blends of Unmodified Propylene Polymers A) and Modified Propylene Polymers B)

In a Collin laboratory twin screw extruder, with a screw diameter of 25 mm, a mixture of 90.0% by weight of a polypropylene homopolymer A1) with a melt index of 2.4 g/10 min at 230° C./2.16 kg, stabilized by 0.1% by weight of tetrakis(methylene(3,5-di-t-butyl hydroxyhydrocinnamate)methane and 0.1% by weight of tris(2,4-di-t-butylphenyl) phosphite and 10.0% by weight of the modified propylene polymer B1) of Example 10, containing 0.8% by weight of bound butadiene and having a melt index of 2.5 g/10 min at 230° C./2.16 kg, a number average molecular weight of 489 kg/mole and an equilibrium compliance of $J_{e0}$ of $4.08 \times 10^{-3}$ $Pa^{-1}$ (creep experiment in conical plate geometry at 230° C.), and a crystallization point (DSC) of 128.5° C., is melted, homogenized at a mass temperature of 238° C. and a residence time of 30 seconds, discharged over two round profile dies at a throughput of 3.9 kg/h, drawn off as two 3 mm thick strands and, after being solidified in the water bath granulated. The granulate has a melt index of 2.3 g/10 min at 230° C./2.16 kg.

Preparation of Injection Molded Polyolefin Parts

The granulate prepared is processed in accordance with DIN 16774 in a Ferromatic Millacron FM 60 injection molding machine, which has a three-zone screw with a screw length of 22 D, at a mass temperature of 225° C. and a mold temperature of 50° C. into standard injection molded test rods.

The following properties were determined using the standard injection molded test rods:
modulus of elasticity: 1678 MPa (23° C., ISO 178)
notched impact strength of Charpy: 5.52 kJ/m² (23° C., ISO 179 1 eA)
crystallization point (DSC, ISO 3146): 127.9° C.

EXAMPLE 13

Preparation of the Blends of Unmodified Propylene Polymers A) and Modified Propylene Polymers B)

In a Collin laboratory twin screw extruder, with a screw diameter of 25 mm, a mixture of 95.0% by weight of a polypropylene homopolymer A1), with a melt index of 8.0 g/10 min at 230° C./2.16 kg, stabilized by 0.1% by weight of tetrakis(methylene(3,5-di-t-butyl hydroxyhydrocinnamate)methane and 0.1% by weight of tris(2,4-di-t-butylphenyl) phosphite and 5.0% by weight of the modified propylene polymer B1) of Example 10, containing 0.8% by weight of bound butadiene and having a melt index of 2.5 g/10 min at 230° C./2.16 kg, a number average molecular weight of 489 kg/mole and an equilibrium compliance of $J_{e0}$ of $4.08 \times 10^{-3}$ $Pa^{-1}$ (creep experiment in conical plate geometry at 230° C.), and a crystallization point (DSC) of 128.5° C., is melted, homogenized at a mass temperature of 238° C. and a residence time of 30 seconds, discharged over two round profile dies at a throughput of 3.9 kg/h drawn off as two 3 mm thick strands and, after being solidified in the water bath, granulated. The granulate has a melt index of 8.5 g/10 min at 230° C./2.16 kg.

Preparation of Injection Molded Polyolefin Parts

The granulate prepared is processed in accordance with DIN 16774 in a Ferromatic Millacron FM 60 injection molding machine, which has a three-zone screw with a screw length of 22 D, at a mass temperature of 225° C. and a mold temperature of 50° C. into standard injection molded test rods.

The following properties were determined using the standard injection molded test rods:
modulus of elasticity: 1713 MPa (23° C., ISO 178)
notched impact strength of Charpy: 3.77 kJ/m² (23° C., ISO 179 1 eA)
crystallization point (DC, ISO 3146): 126.8° C.

Standard injection molded test bars, produced entirely under the same conditions from 100% of the corresponding polypropylene homopolymer A1), which has a melt index of 8.0 g10 min at 230° C./2.16 kg, stabilized by 0.1% by weight of tetrakis(methylene(3,5-di-t-butyl hydroxyhydrocinnamate)methane and 0.1% by weight of tris(2,4-di-t-butylphenyl) phosphite have, for comparison, the following properties:

modulus of elasticity: 1580 MPa (23° C, ISO 178)
notched impact strength of Charpy: 3.30 kJ/m² (23° C., ISO 179 1 eA)
crystallization point (DSC, ISO 3146): 113.6° C.

EXAMPLE 14

Preparation of the Modified Propylene Polymer B1

A powdery, random polypropylene copolymer, with a melt index of 0.85 g/10 min at 230° C./2.16 kg and an average particle diameter of 0.85 mm, is added continuously to a continuous, heated mixer. Furthermore, 0.05% by weight of hydrotalcit, 0.05% by weight of calcium stearate and 0.45% by weight of t-butyl peroxybenzoate, in each cased based on the polypropylene copolymer, are added continuously to the continuous mixer. While being mixed homogeneously at 70° C., the polypropylene homopolymer, charged with the thermally decomposing free radical-forming agent and auxiliary material, is charged by adsorption from the divinylbenzene and nitrogen mixture flowing in, during a residence time of 4 minutes at 70° C., with 0.35% by weight of divinylbenzene, based on the polypropylene homopolymer. After being transferred to the twin screw extruder, the powdery reaction mixture, in contact with the mixture of divinylbenzene and nitrogen, which has been added, and with addition of 0.1% by weight of tetrakis (methylene(3,5-di-t-butyl hydroxyhydrocinnamate)methane and 0.1% by weight of tris(2,4-di-t-butylphenyl) phosphite is melted at a mass temperature of 225° C. and, after a rough degassing, is subjected to a fine degassing with addition of water as entraining agent, discharged and granulate.

The resulting, modified polypropylene contains 0.32% by weight of bound divinylbenzene, A determined by IR spectroscopy, and has a melt index of 1.35 g/10 min at 230° C./2.16 kg, a number average molecular weight of 550 kg/mole, an equilibrium compliance $J_{e0}$ of 4.65 at $10^{-3}$ $Pa^{-1}$ (creep experiment in conical plate geometry at 230° C.) and a crystallization point (DSC, ISO 3146) of 128.8° C.

Preparation of Blends of Unmodified Propylene Polymers A) and Modified Propylene Polymers B)

In a Collin laboratory twin screw extruder, with a screw diameter of 25 mm, a mixture of 95.0% by weight of a reactor blend A2), with an ethylene content of 33 mole percent, a melt index of 3 g/10 min at 230° C./2.16 kg, consisting of a crystalline propylene-ethylene copolymer and an elastic ethylene-propylene copolymer and stabilized by 0.1% by weight of tetrakis(methylene(3,5-di-t-butyl hydroxyhydrocinnamate )methane and 0.1% by weight of tris(2,4-di-t-butylphenyl) phosphite and 5.0% by weight of a modified propylene polymer B1) containing 0.32% by weight of bound divinylbenzene and having a melt index of 1.35 g/10 min at 230° C./2.16 kg, a n umber average molecular weight of 550 kg/mole and an equilibrium compliance of $J_{e0}$ of $4.65 \times 10^{-3}$ $Pa^{-1}$ (creep experiment in conical plate geometry at 230° C.) an a crystallization point (DSC) of 128.8° C., homogenized at a mass temperature of 235° C. and a residence time of 30 seconds is discharged over two round profile dies at a throughput of 4.1 kg/h, drawn off as two 3 mm thick strands and, after being solidified in the water bath, granulated. The granulate has a melt index of 2.2 g/10 min at 230° C./2.16 kg.

Preparation of Injection Molded Polyolefin Parts

The granulate prepared is processed in accordance with DIN 16774 in a Ferromatic Millacron injection molding machine, which has a three-zone screw with a screw length of 22 D, it a mass temperature of 225° C. and a mold temperature of 50° C. into standard injection molded test rods.

The following properties were determined using the standard injection molded test rods:
modulus of elasticity: 1271 MPa (23° C., ISO 178)
notched impact strength of Charpy: 12.37 kJ/m$^2$ (23° C., ISO 179 1 eA)
crystallization point (DSC, ISO 3146): 126.5° C.

Standard injection molded test bars, produced entirely under the same conditions from the corresponding reactor blend A2), which has an ethylene content of 33 mole percent and a melt index of 3 g/10 min at 230° C./2.16 kg, consisting of a crystalline propylene-ethylene copolymer and an elastic ethylene-propylene copolymer, stabilized by 0.1% by weight of tetrakis(methylene(3,5-di-t-butyl hydroxyhydrocinnamate)methane and 0.1% by weight of tris(2,4-di-t-butylphenyl) phosphite have, for comparison, the following properties:
modulus of elasticity: 1204 MPa (23° C., ISO 178)
notched impact strength of Charpy: 10.9 kJ/m$^2$ (23° C., ISO 179 1 eA)
crystallization point (DSC, ISO 3146): 99.2° C.

EXAMPLE 15

Preparation of the Modified Propylene Polymer B3

The modified propylene polymer B3) is synthesized by the method of Example 4. The resulting modified polypropylene contains 1.1% of bound vinyltriethoxysilane, as determined by IR spectroscopy, and has a melt index of 1.95 g/10 min at 230° C./2.16 kg. After the addition of 0.1% by weight of tetrakis(methylene(3,5-di-t-butyl hydroxyhydrocinnamate)methane, 0.1% by weight of tris(2, 4-di-t-butylphenyl) phosphite and 0.2% by weight of dibutyl tin dilaurate, homogenization in the Collin twin screw laboratory extruder at a mass temperature of 225° C. and granulating, the modified polypropylene has an equilibrium compliance $J_{e0}$ of 2.15 10$^{-3}$ Pa$^{-1}$ (creep experiment in conical plate geometry at 230° C.) and a crystallization point (DSC, ISO 3146) of 131° C.

Preparation of Blends of Unmodified Propylene Polymers A) and Modified Propylene Polymers B)

In a Collin laboratory twin screw extruder, with a screw diameter of 25 mm, a mixture of 95.0% by weight of a polypropylene homopolymer A1) with a melt index of 2.4 g/10 min at 230° C./2.16 kg, stabilized by 0.1% by weight of tetrakis(methylene(3,5-di-t-butyl hydroxyhydrocinnamate)methane and 0.1% by weight of tris(2,4-di-t-butylphenyl) phosphite and 5.0% by weight of the modified propylene polymer B3), containing 1.1% by weight of bound vinyltriethoxysilane and having a melt index of 1.05 g/10 min at 230° C./2.16 kg, an equilibrium compliance of $J_{e0}$ of 2.15×10$^{-3}$ Pa$^{-1}$ (creep experiment in conical plate geometry at 230° C.), and a crystallization point (DSC) of 131° C., is melted, homogenized at a mass temperature of 245° C. and a residence time of 30 seconds, discharged over two round profile dies at a throughput of 4.0 kg/h, drawn off as two 3 mm thick strands and, after being solidified in the water bath, granulated. The granulate has a melt index of 2.1 g/10 min at 230° C./2.16 kg.

Preparation of Injection Molded Polyolefin Parts

The granulate prepared is processed in accordance with DIN 16774 in a Ferromatic Millacron injection molding machine, which has a three-zone screw with a screw length of 22 D, at a mass temperature of 225° C. and a mold temperature of 50° C. into standard injection molded test rods.

The following properties were determined using the standard injection molded test rods:
modulus of elasticity: 1708 MPa (23° C., ISO 178)
notched impact strength of Charpy: 6.55 kJ/m$^2$ (23° C., ISO 179 1 eA)
crystallization point (DSC, ISO 3146): 127.8° C.

EXAMPLE 16

Preparation of the Modified Propylene Polymer B1

In a kneader, 0.15% by weight of 2,6-dicyclopentyl-4-methylphenol and 0.15% by weight of bis-2,2,6,6-tetramethyl-4-piperidyl sebacate are drummed onto a powdery polypropylene homopolymer, having a melt index of 0.9 g/10 min at 230° C./2.16 kg and an average particle diameter of 0.2 mm and the mixture is passed pneumatically by inert gas into a 0.20×3.50 m cassette reactor with four integrated cathodes of a low energy accelerator of the band radiation emitter type (energy: 250 keV, radiation output 4×10 KW) and integrated vibration equipment, the throughput at a radiation temperature of 85° C. being 3.5 kg/min.

The irradiated powdery mixture is granulated in a Werner & Pfleiderer twin screw ZSK 54 extruder with addition of 0.1% by weight tetrakis(methylene(3,5-di-t-butyl hydroxyhydrocinnamate)methane and 0.1% by weight of tris(2,4-di-t-butylphenyl) phosphite under inert conditions at 235° C. The partially modified polypropylene mixture has a melt index of 3.9 g/10 min at 230° C./2.16 kg and a crystallization point (DSC, ISO 3146) of 126.5° C.

Preparation of the Blends of Unmodified Propylene Polymers A and Modified Propylene Polymers B In a Collin laboratory twin screw extruder, with a screw diameter of 25 mm, a mixture of 78.0% by weight of a polypropylene homopolymer A1), with a melt index of 2.4 g/10 min at 230° C./2.16 kg, stabilized by 0.1% by weight of tetrakis(methylene(3,5-di-t-butyl hydroxyhydrocinnamate)methane and 0.1% by weight of tris(2,4-di-t-butylphenyl) phosphite, and 22.0% by weight of a partially modified polypropylene mixture, with a melt index of 3.9 g/10 min at 230° C./2.16 kg, a crystallization point (DSC) of 126.5° C., melted, homogenized at a mass temperature of 240° C. and a residence time of 28 seconds, is discharged over two round profile dies at a throughput of 4.0 kg/h, drawn off as two 3 mm thick strands and, after being solidified in the water bath, granulated. The granulate has a melt index of 2.4 g/10 min at 230° C./2.16 kg.

Preparation of Injection Molded Polyolefin Parts

The granulate prepared is processed in accordance with DIN 16774 in a Ferromatic Millacron injection molding machine, which has a three-zone screw with a screw length of 22 D, at a mass temperature of 225° C. and a mold temperature of 50° C. into standard injection molded test rods.

The following properties were determined using the standard injection
molded test rods:
modulus of elasticity: 1797 mpa (23° C., ISO 178)
notched impact strength of charpy: 5.54 kJ/m$^2$ (23° C., ISO 179 1 eA)

crystallization point (DSC, ISO 3146): 126.5° C.

What is claimed is:

1. A molded polyolefin article of improved dimensional stability at elevated temperatures and improved stiffness, said article comprising:

about 60% to about 99.9% by weight of an unmodified propylene polymer composition A, wherein said unmodified propylene polymer composition A is selected from the group consisting of A1) at least one of a conventional propylene polymer and a copolymer of at least one of propylene, ethylene and α-olefins having 4 to 18 carbon atoms and a propylene content of about 80.0% to about 99.9% by weight in a form of at least one of a random copolymer, a block copolymer, and a random block copolymer, having melt indexes of about 0.1 g/10 min to about 300 g/10 min at about 230° C./2.16 kg, A2) a polyolefin mixture having an $M_W/M_N$ ratio of about 2 to about 6 wherein $M_W$ is average molecular weight and $M_N$ is number average molecular weight and a melt index of about 1 g/10 min to about 40 g/10 min at about 230° C./2.16 kg, said mixture consisting of A2.1) about 60% to about 98% by weight of a crystalline copolymer of about 85% to about 95% by weight of propylene and about 15% to about 0.5% by weight of at least one of ethylene and an α-olefin of the general formula $CH_2=CHR$, wherein R is a linear or branched alkyl group having 2 to 8 carbon atoms, and A2.2) about 2% to about 40% by weight of an elastic copolymer of about 20% to about 70% by weight of ethylene and about 80% to about 30% by weight of at least one of propylene and an α-olefin of the general formula $CH_2=CHR$, wherein R is a linear or branched alkyl group having 2 to 8 carbon atoms, A3) one of a largely amorphous polypropylene and a propylene copolymer having one of a crystalline polypropylene and a crystalline propylene copolymer content of less than about 10% by weight, an enthalpy of melting of less than about 40 J/g, and a melt index of about 0.1 g/10 min to about 100 g/10 min at about 230° C./2.16 kg, said largely amorphous polypropylene being at least one of a homopolymer of propylene and a copolymer of propylene of at least 80 mole percent propylene and not exceeding 20 mole percent of at least one α-olefin of the general formula $CH_2=CHR$, wherein R is a linear or branched alkyl group having 2 to 8 carbon atoms, and A4) a non-isotactic propylene homopolymer having a melting point of about 145° C. to about 165° C., a melt viscosity of about 200,000 cps at about 190° C., a heat of crystallization of about 4 calories per gram to about 10 calories per gram, and about 35% to about 55% by weight being soluble in diethyl ether, said unmodified propylene composition A further comprising materials selected from the group consisting of about 0.01% to about 2.5% by weight of stabilizers, about 0.01% to about 5% by weight of processing aids, about 0.1% to about 1% by weight of antistats, about 0.2% to about 3% by weight of pigments, about 0.05% to about 1% by weight of nucleating agents, about 2% to about 20% by weight of flame retardants, and about 3% to about 40% by weight of at least one of inorganic fillers, organic fillers and reinforcing materials wherein percentage of each of the materials is based on percentage of said unmodified propylene polymer composition A present in said article; and about 40% to about 0.1% by weight of a modified propylene polymer composition B, wherein said modified propylene polymer composition B is at least one of a modified propylene homopolymer and a modified propylene copolymer having melt indexes of about 0.05 g/10 min to about 40 g/10 min at about 230° C./2.16 kg and a ratio of an intrinsic viscosity of said modified propylene polymer composition B to an intrinsic viscosity of basic, unmodified propylene polymer having substantially same weight average molecular weight of about 0.20 to about 0.95, and wherein said modified propylene polymer composition B is selected from the group consisting of B1) a modified propylene polymer synthesized by treatment of at least one of a propylene homopolymer and a copolymer of propylene and ethylene or α-olefins having 4 to 18 carbon atoms with at least one of multifunctional, ethylenically unsaturated monomers and ionizing radiation or free radical-forming agents, B2) a modified propylene polymer synthesized by the reaction of a functionalized polypropylene with a low molecular weight multifunctional compound of opposite reactivity, and B3) a modified propylene polymer synthesized by hydrolytic condensation of a polypropylene containing hydrolyzable silane groups.

2. The molded polyolefin article of claim 1, wherein said modified propylene polymer B1) is produced by treatment of at least one of a propylene homopolymer and a copolymer of propylene and ethylene or α-olefins having 4 to 18 carbon atoms with multifunctional ethylenically unsaturated monomers and free radical-forming agents, said modified propylene polymer B1) is synthesized by a continuous method wherein 1) polypropylene particles are prepared from at least one of 1.1) a propylene homopolymer and 1.2) a copolymer of propylene and ethylene or α-olefins having 4 to 18 carbon atoms, wherein said 1.1) and said 1.2) are mixed in a continuous mixer with about 0.05% to about 3% by weight, based on said polypropylenes used, of the free radical-forming agents with heating to about 30° C. to about 100° C., 2) readily volatile, bifunctional monomers wherein said bifunctional monomers are absorbed by said polypropylene particles from the gas phase at a temperature T of about 20° C. to about 120° C. and an average absorption time $t_s$ of about 10 seconds to about 1,000 seconds proportion of said bifunctional monomers in said polypropylene particles being about 0.01% to about 10% by weight, based on said polypropylenes used, 3) said polypropylene particles monomer are melted under an atmosphere of an inert gas and at a temperature about 110° C. to about 210° C. to form a melt, 4) the melt is heated to about 220° C. to about 300° C. wherein unreacted monomers and decomposition are removed, and 5) the melt is granulated in a known manner, wherein materials selected from the group consisting of about 0.01% to about 2.5% by weight of stabilizers, about 0.1% to about 1% by weight of antistatic agents, about 0.2% to about 3% by weight of pigments, about 0.05% to about 1% by weight of nucleating agents, and about 0.01% to about 5% by weight of processing aids are added in at least one occurrence wherein a first occurrence is prior to at least one of step 1) and step 5) of the continuous method and a second occurrence is prior to or during at least one of step 3) and step 4) of the continuous method, wherein percentage of each of the materials is based on percentage of said polypropylenes used.

3. The molded polyolefin article of claim 1 or 2, wherein said modified propylene polymer composition B has a weight average molecular weight of about 350 k/mole to about 1,500 kg/mole and an equilibrium compliance of $J_{e0}$ of about 1.2 $Pa^{-1}$ to about 12 $Pa^{-1}$.

4. The molded polyolefin article of claim 1 or 2, wherein said molded polyolefin article is produced by blow molding and is at least one of bottles, boxes, containers, liquid containers, parts that supply liquids, parts that supply air, internal containers, tanks, folding bellows, covers, housings, connecting pieces, pipes, and transporting suitcases.

5. A method for producing a molded polyolefin article of improved dimensional stability at elevated temperatures and improved stiffness of claim 1, the method comprising the steps of:

melting and homogenizing a mixture of said unmodified propylene polymer composition A and of said modified propylene polymer composition B at temperatures of about 180° C. to about 300° C. for forming a molten mixture; and one of the steps of 1) extruding the molten mixture through annular dies as a tubular parison, molding the molten mixture into a hollow object by blowing the molten mixture into a divided blowing mold, and keeping the molten mixture at a temperature of about 10° C. to about 55° C., 2) injecting the molten mixture into an injection mold, heating the molten mixture to about 20° C. to about 130° C. to produce the parison, removing the parison from the injection mold, transferring the parison into a blowing mold, and blowing to mold the parison into a hollow body, and 3) processing the molten mixture in an injection molding machine at mass temperatures of about 200° C. to about 300° C. at high injection speeds, and at mold temperatures of about 5° C. to about 70° C. into an injection molded article.

6. The molded polyolefin article of claim 2, wherein the free radical-forming agents are selected from the group consisting of acyl peroxides, alkyl peroxides, hydroperoxides, peroxycarbonates, and peresters.

7. The molded polyolefin article of claim 1 or 2, wherein said molded polyolefin article is produced by injection molding and is at least one of packing, pharmaceutical and food packaging transporting containers, components of automobile industry, components of machinery, domestic appliances, and electric and electronic equipment.

8. The molded polyolefin article of claim 1, wherein percentage of said unmodified propylene polymer A is about 75% to about 98% by weight and percentage of said modified propylene polymer B is about 25% to about 2% by weight.

9. The molded polyolefin article of claim 1, wherein the conventional propylene polymer is a propylene homopolymer.

10. The molded polyolefin article of claim 1, wherein the conventional propylene polymer has an $M_W/M_N$ ratio of about 2 to about 4.5 wherein $M_W$ is average molecular weight and $M_N$ is number average molecular weight.

11. The molded polyolefin article of claim 1, wherein the melt index of said A1) is about 1 g/10 min to about 100 g/10 min at about 230° C./2.16 kg.

12. The molded polyolefin article of claim 1, wherein the melt index of said modified propylene polymer B is about 0.25 g/10 min to about 15 g/10 min at about 230° C./2.16 kg.

13. The molded polyolefin article of claim 1, wherein the functionalized polypropylene of said B2) is a polypropylene having at least one of an acid group and an anhydride group.

14. The molded polyolefin article of claim 1, wherein the low molecular weight multifinctional compound of opposite reactivity has at least one of a $C_2$ to $C_{16}$ diamine and a $C_2$ to $C_{16}$ diol.

15. The molded polyolefin article of claim 2, wherein said polypropylene particles of said 1) is in a form selected from a powder, a granulate, and a gravel.

16. The molded polyolefin article of claim 2, wherein each of said polypropylene particles of said 1) has a size of about 0.001 mm to about 7 mm.

17. The molded polyolefin article of claim 2, wherein the propylene homopolymer of said 1.1) has a bimodal molecular weight distribution, an average molecular weight $M_W$ of about 500,000 g/mole to about 1,500,000 g/mole, a number average molecular weight $M_n$ of about 25,000 g/mole to about 100,000 g/mole, and an $M_w/M_n$ value of about 5 to about 60.

18. The molded polyolefin article of claim 2, wherein the copolymer of propylene and ethylene or $\alpha$-olefins having 4 to 18 carbon atoms of said 1.2) is at least one of a random propylene copolymer, a propylene block copolymer, a random propylene block copolymer, and an elastomeric polypropylene.

19. The molded polyolefin article of claim 2, wherein the mixing of the propylene particles of said 1) with the free radical-forming agents of said 1.2) results in thermal decomposition being concluded at a temperature below 210° C.

20. The molded polyolefin article of claim 2, wherein mixture from the mixing of the propylene particles of said 1) with the free radical-forming agents of said 1.2) is diluted with inert solvents.

21. The molded polyolefin article of claim 2, wherein the heating of said 1.2) takes place at about 70° C. to about 90° C.

22. The molded polyolefin article of claim 2, wherein said at least one bifunctional monomer is at least one of a $C_4$ to $C_{10}$ diene and a $C_7$ to $C_{10}$ divinyl compound.

23. The molded polyolefin article of claim 2, wherein the temperature of said 2) is about 60° C. to about 100° C.

24. The molded polyolefin article of claim 2, wherein the average absorption time $t_s$ of said 2) is about 60 seconds to about 600 seconds.

25. The molded polyolefin article of claim 2, wherein the proportion of said 2) is about 0.05% to about 2% by weight.

26. The molded polyolefin article of claim 4, wherein said polyolefin article is one of a large capacity, blow molded polyolefin article having a capacity of about 5L to about 200 L and a foamed, molded polyolefin article having a foam density of about 300 kg/m³ to about 700 kg/m³.

27. The method of claim 5, wherein percentage of the unmodified propylene polymer A is about 75% to about 98% by weight and percentage of the modified propylene polymer B is about 25% to 2% by weight.

28. The method of claim 5, wherein the mass temperatures of said 3) are about 240° C. to about 270° C.

29. The method of claim 5, wherein the mold temperatures of said 3) are about 20° C. to about 50° C.

30. The method of claim 5, wherein the melting and homogenizing of the mixture is accomplished in a kneader.

31. The method of claim 5, wherein the molten mixture of said 1) is blown into a second blowing mold, is longitudinally stretched by a stretching stamp, and is radially stretched by blown air before forming the molded polyolefin article.

32. The method of claim 5, wherein the parison of said 2) is heated in a conditioning mold to temperatures of about 80° C. to about 160° C. after being removed and before being transferred to the blowing mold.

33. The method of claim 5, wherein the parison of said 2) is longitudinally stretched by a stretching stamp before forming the molded polyolefin article.

34. The method of claim 5, wherein the molten mixture of said 3) is cooled and granulated before being processed.

35. The method of claim 5, wherein the injection molding machine has injection zones and three-zone screws with a screw length of 18 to 24 D wherein D is the diameter of the screw.

* * * * *